United States Patent [19]

Magnuson

[11] 4,029,036
[45] June 14, 1977

[54] STABILIZATION AND MOTION ALLEVIATION OF AIR CUSHION BORNE VEHICLES

[76] Inventor: Allen H. Magnuson, 2014 Hanover St., Silver Spring, Md. 20910

[22] Filed: Mar. 23, 1976

[21] Appl. No.: 669,793

[52] U.S. Cl. .............................. 114/67 A; 180/121
[51] Int. Cl.² ......................................... B63B 1/34
[58] Field of Search ................ 114/67 A, 121, 122; 180/116–129

[56] References Cited

UNITED STATES PATENTS

| | | | |
|---|---|---|---|
| 3,297,102 | 1/1967 | Cockerell | 180/118 |
| 3,742,888 | 7/1973 | Crowley | 180/126 |
| 3,850,126 | 11/1974 | Leonard | 114/67 A |

Primary Examiner—Stephen G. Kunin
Assistant Examiner—Jesus D. Sotelo
Attorney, Agent, or Firm—R. S. Sciascia; Q. E. Hodges

[57] ABSTRACT

An automatic pitch stabilization and motion alleviation device for air cushion borne vehicles, equally applicable to fully-skirted and to rigid sidewall vehicles. The vehicle's air cushion plenum is divided into bow and stern compartments by a transverse seal. Vehicle lift fans and a unique ducting arrangement supply air flow to the air cushion compartments and seal system. A valve, in a portion of the duct feeding air to the forward compartment, regulates the pressure drop from the stern compartment to the forward compartment. The valve is capable of providing 30–100% higher mean pressure in the aft compartment relative to the forward compartment. The valve is actuated automatically by height, motion, rate, acceleration, and pressure sensors, the outputs of which are fed to the valve servomechanisms to provide effective underway dynamic control of the pressure differential between compartments for motion stabilization in pitch and for improvements of ride quality.

8 Claims, 3 Drawing Figures

STABILIZATION AND MOTION ALLEVIATION OF AIR CUSHION BORNE VEHICLES

The invention described herein may be maufactured and used by or for the Government of the United States of America for governmental purposes without the payment of any royalties thereon or thereafter.

BACKGROUND OF THE INVENTION

Prior art fully skirted hover-craft, such as disclosed in the patent to Leonard, U.S. Pat. No. 3,850,126 use fore and aft air cushion plenum subdivision, achieved by a transverse skirt or seal barrier located in the vicinity of the vehicle's center of gravity to provide static pitch trim stability when a load is carried on a deck on the forward part of the craft. The static stabilization in the loaded condition is accomplished by maintaining an over-pressure in the forward compartment relative to the aft compartment. Both compartments have approximately the same cushion pressure in the unloaded condition. An air passage duct provides a path for transferring air to and from the fore and aft cushion compartments. A flow control valve mounted in the duct, may be manually or automatically adjusted to support loads of varying weight on the forward deck. This control means is intended primarily to regulate static trim according to the weight distribution.

The disadvantage of the foregoing type of stabilization as illustrated by the patent to Leonard is that it does not provide adequate air flow for dynamic pitch trim control of the vehicle in the unloaded or lightly loaded condition, but rather only static condition control, because there is little or no pressure differential from the aft compartment to the forward compartment. Also, no means is specified for automatically controlling the flow control valve in the duct for regulating ride quality in waves. In fact, Leonard suggests a higher pressure being maintained in the forward compartment. Thus his flexible transverse barrier would have to be of the closed finger type, that is, not open in the rear, because otherwise, an overpressure in the forward compartment would cause open fingers to collapse. Furthermore, these closed fingers are more complex and therefore more difficult to maintain.

In regard to rigid sidewall vehicles, such as the captured air bubble (CAB) vehicles, the prior art air cushion plenums are not subdivided transversely and achieve inadequate pitch trim stabilization from the bow and stern seals and the sidewalls. In waves, vehicle motion in pitch can be excessive causing wave impacts of great force which at least make for an uncomfortable ride and can be damaging.

SUMMARY OF THE INVENTION

Briefly, the instant invention overcomes the disadvantages of the prior art air cushion borne vehicles by providing an automatic stabilization and motion alleviation system that is applicable to fully-skirted vehicles and to rigid sidewall vehicles having flexible bow and stern seals. The system comprises a transverse seal subdividing the plenum (i.e. the air cushion) into forward and aft compartments; a ducting arrangement, having air flow supplied by lifting fans; and a valve in the portion of the duct feeding pressurized air from the aft to the forward compartment. The valve regulates the pressure drop from the stern compartment to the forward compartment. In both the fully-skirted vehicle and the rigid sidewall vehicle, the open fingers of the transverse and bow seals are inflated with pressurized cushion air from the aft and forward compartments, respectively. The stern seal in the rigid sidewall vehicle, and the air bag of the seal system of the fully-skirted vehicle, are inflated by air fed directly from the lift fan or fans or by a separate source of pressurized air. An over-pressure is maintained in the stern seal or air bag by means of an automatically regulated pressure differential control valve in the duct, if the air supply is from the lift fan or fans. The fully-skirted model has flexible side seals and may have bow and stern finger type inflated seals, while the other model has rigid side seals and may have a semi-planing or planing stern seal and either a finger, or bag-and-finger, or a planing or semi-planing inflated bow seal. The valve in the portion of the duct between the forward and aft compartment can be adjusted to a mean setting to provide for static pitch trim stability while an automatically actuated variable setting provides for dynamic pitch control for motion stability, in waves or other surface irregularities, to provide an improved ride quality. A higher mean pressure is required in the aft compartment to maintain a large flow rate from the aft to the forward compartment and to inflate the open-backed fingers of the transverse seal. The mean pressure in the aft compartment should be maintained about 30-100% higher than in the forward compartment to achieve the above described results.

STATEMENT OF THE OBJECTS OF THE INVENTION

Accordingly, an objective of the present invention is to provide a new, improved, and reliable means of stabilization for air cushion borne vehicles.

Another objective of the instant invention is to provide automatic static pitch trim control for air cushion borne vehicles.

A further objective of the present invention is to provide dynamic stabilization and motion alleviation for both rigid sidewall vehicles and for fully-skirted vehicles that are air cushion borne.

Still another objective of the present invention is to provide automatic pitch trim stability and motion alleviation for air cushion borne vehicles while at rest, and while underway for both loaded and unloaded conditions, including longitudinal shifts in payload.

BRIEF DESCRIPTION OF THE DRAWINGS

A more complete understanding of the invention and many of the attendant advantages thereto will be apparent from the following detailed description when considered in conjunction with the accompanying drawings, wherein.

DESCRIPTION OF THE PREFERRED EMBODIMENTS

Figure 1:
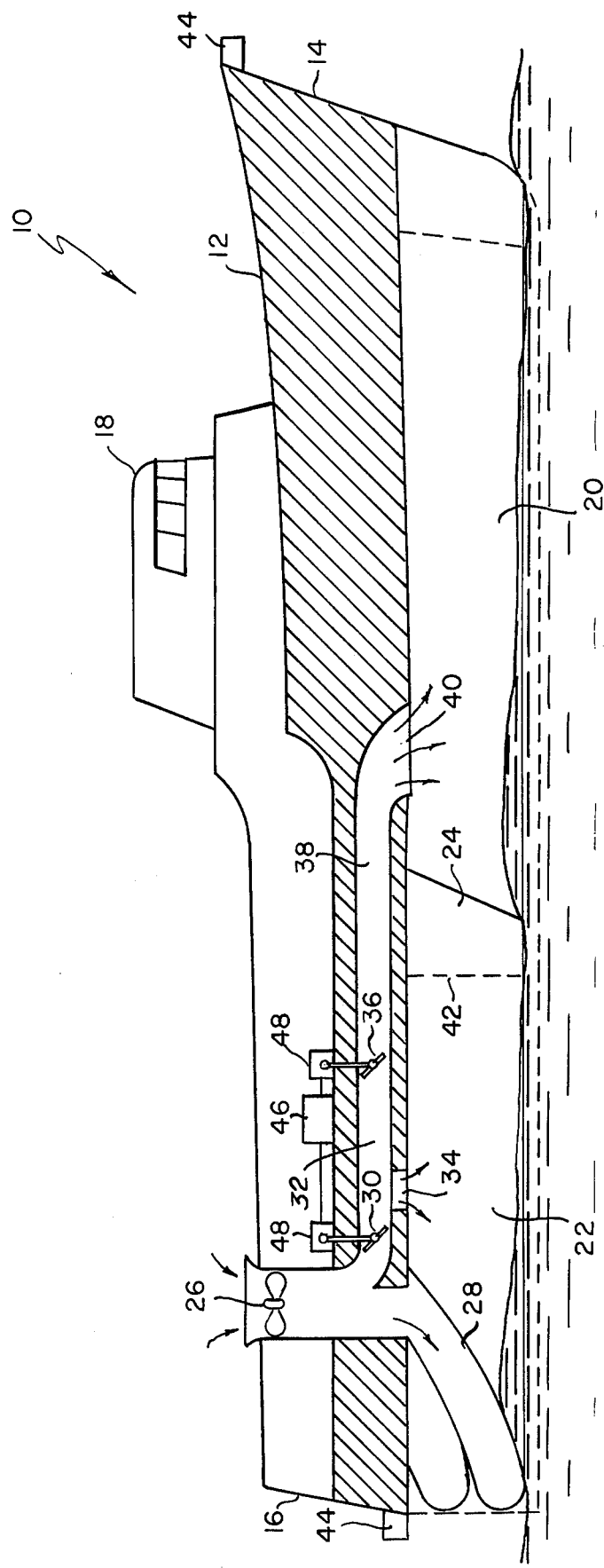
FIG. 1 is a side elevation schematic view, partially in section, of a rigid sidewall vehicle with stabilization and motion alleviation.

Referring now to the drawings wherein like reference numerals refer to the same item, there is shown in FIG.

Figure 2:
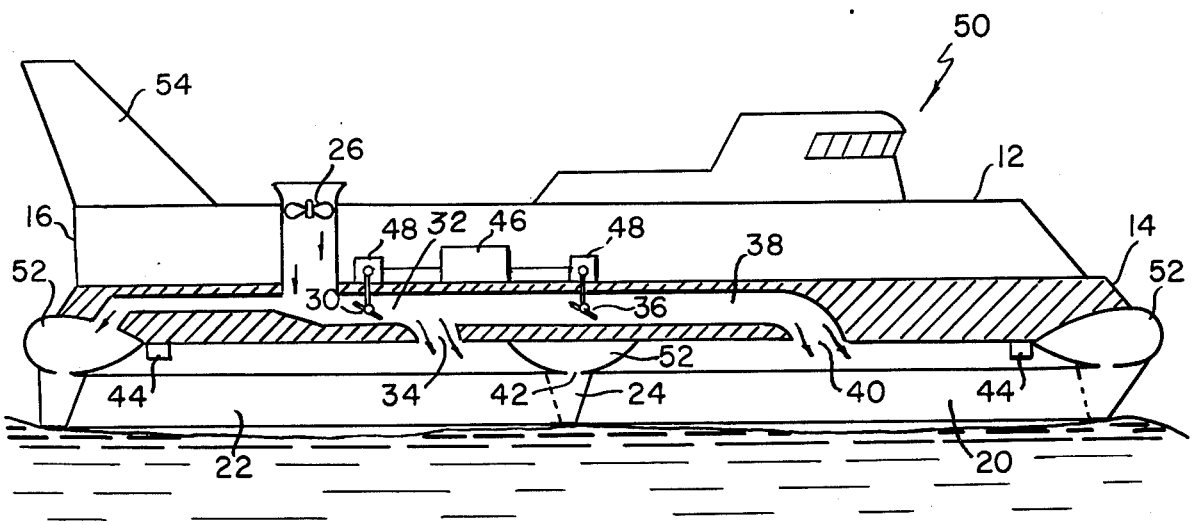
FIG. 2 is a side elevation schematic view partially in section, of a fully-skirted vehicle with stability and motion alleviation according to the invention.

1 a rigid sidewall air cushion borne vehicle 10, and in FIG. 2 a fully-skirted air cushion borne vehicle 50. Each of the vehicles 10 and 50 have a hull 12, a bow 14 and a stern 16. A superstructure and control cabin 18 are mounted on the hull 12.

Referring to both FIG. 1 and FIG. 2 wherein the common items have the same numerals, both the common and the items peculiar to each vehicle will be discussed below. The air cushion plenum which is under the hull 12 and supports the vehicles is subdivided into a forward air cushion compartment 20 and an aft air cushion compartment 22 separated by a transverse seal 24, which may be of the self-inflated finger type or the inflated bag and open-finger type. Near the stern 16 of the hull 12 is a means to supply pressurized air such as a lift fan or fans 26 to the seal systems and the two air cushion compartments 20, 22.

Figure 3:
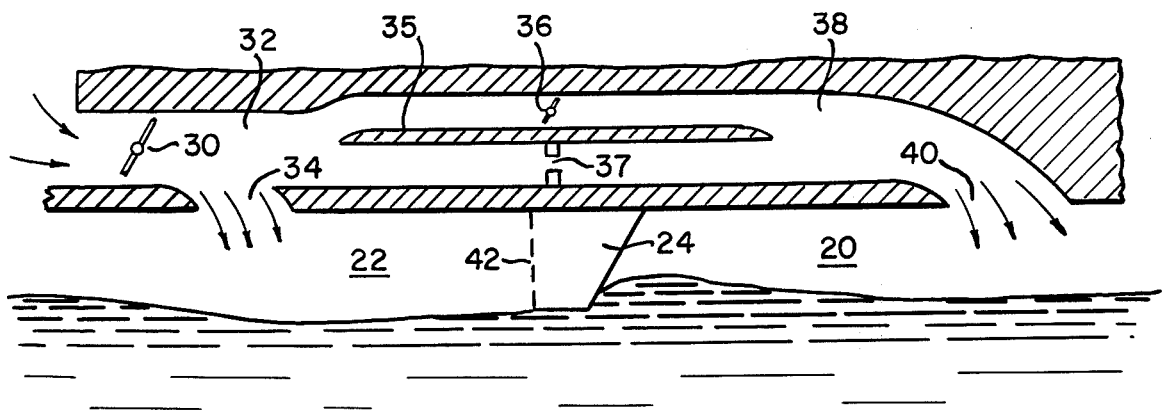
FIG. 3 is a side elevation cross sectional view showing parallel ducting to the forward compartment having a fixed orifice and a variable valve orifice as an alternative embodiment.

The over-pressure in the stern seal 28 relative to the pressure in the aft compartment 22 on the FIG. 1 rigid sidewall embodiment, is regulated by an automatically controlled valve 30 in a ducting arrangement 32. Likewise, the over-pressure in the air bag supplying air to the seal system 52 on the FIG. 2, fully-skirted embodiment, is regulated by an automatically controlled valve 30 in a ducting arrangement 32. In both embodiments, air is fed downstream of the valve 30 through duct 32 and into the aft compartment 22 through port 34. In both embodiments, a separate pressurized air supply (not shown) may be used to inflate the stern seal or the inflated air bag of the seal system; in which case, the seal system air could be vented by means of an automatically operated valve (not shown) into the aft air compartment. A differential pressure control valve 36, in forward duct 38 and downstream of valve 30 and port 34, regulates the pressure drop from the aft cushion compartment 22 to the forward cushion compartment 20, thus maintaining a pressure differential between the two compartments. As shown in the FIG. 3 embodiment, the duct 38 may be separated into two parallel paths with a splitter plate 35 for splitting the flow through a fixed orifice 37, and a variable orifice (the pressure differential control valve 36). All other elements are the same as the FIG. 1 and FIG. 2 embodiments. Air continues forward in duct 38 through a forward discharge port 40 into the forward cushion compartment. In view of the pressure drop to the forward cushion compartment the higher pressure in the aft cushion compartment enters the open rear side of the open fingers of the transverse seal 24.

In both FIG. 1 and FIG. 2 embodiments, mounted on the bow 14 and the stern 16 of the hull 12, are sensor packages 44 containing height, motion, rate, pressure, and acceleration sensors. Signals from these sensors are suitably filtered and mixed to optimize the performance of the vehicle. These signals are then fed to the valve control unit 46 mounted in the hull 12. Control unit 46 then drives servomechanisms 48 for the dynamic adjustment of the seal valve 30 and the cushion differential pressure control valve 36. Also the FIG. 2 fully-skirted embodiment may have a vertical stabilizing fin 54, which is not part of the invention.

In operation, this stabilization and motion alleviation system provides an air flow into the forward cushion 20 through the duct 38, controlled by the pressure differential control valve 36 to produce a pressure drop, relative to the aft cushion pressure. The pressure differential control valve 36 is capable of adjustment to a predetermined setting so that the aft compartment mean pressure is approximately 30-100% higher than the forward compartment mean pressure. Dynamic control in pitch is achieved by actuation of the pressure differential control valve 36 about this predetermined setting in response to the sensors 44 and the control unit 46 through the servomechanisms 48. Thus is provided an effective underway dynamic control of pitch and an improvement in ride quality by means of dynamic control of the differential pressure between the two compartments.

Obviously, many modifications and variations of the present invention are possible in light of the above teachings. It is therefore to be understood that within the scope of the appended claims, the invention may be practiced otherwise than as specifically described. The invention is applicable to both fully-skirted air cushion vehicle for land and sea use, and for rigid sidewall air cushion vehicles (CAB for example) generally used over water. Further it is to be understood that the pressure differential between the forward and aft air cushion compartments may be regulated using two parallel ducts one having a fixed orifice and the other, an automatically controlled valve.

What is claimed is:

1. An automatic pitch stabilization and motion alleviation system for air cushion borne vehicles comprising:

means on the vehicle hull for supplying pressurized air to the air cushion system comprising a forward and an aft air cushion compartment, and a seal system means for sealing said air cushion system, said seal system means further comprising transverse seal means for dividing the air cushion into the forward air cushion compartment and the aft air cushion compartment, side seal means for sealing the sides of the air cushion compartments, bow seal means for sealing the bow of the forward air cushion compartment, and stern seal means for sealing the stern of the aft air cushion compartment;

means for causing a controllable pressure drop from said aft air cushion compartment to said forward air cushion compartment, said means further comprising an air ducting system feeding pressurized air to the seal sytem means and to the forward and aft air cushion compartments, a control valve operating in said ducting system and regulating the differential over-pressure of said seal means, bow seal means, and stern seal means relative to the aft air cushion compartment, and a pressure differential control valve operating in said ducting system regulating differential over-pressure of the aft cushion compartment relative to the forward cushion compartment.

2. The automatic pitch stabilization system of claim 1 wherein said transverse seal means for dividing said forward and aft cushion compartments comprises:

a self-inflating, open-finger type seal.

3. The automatic pitch stabilization system of claim 2 wherein said means for sealing the sides, bow and stern comprise:

rigid sidewalls;

a bow seal sealing the bow portion of said forward compartment; and a stern seal sealing the stern portion of said aft compartment.

4. The automatic pitch stabilization system of claim 2 wherein said means for sealing the sides, bow, and stern comprise:

fully-skirted inflated bag and self-inflating, finger type seals.

5. The automatic pitch stabilization system of claim 3 wherein said control valves and said pressure differential control valves are automatically actuated by:
  sensors, suitably mounted on the vehicle producing signals, properly filtered and mixed, derived from height, motion, rate, acceleration, and pressure.

6. The automatic pitch stabilization system of claim 4 wherein said control valves and said pressure differential control valves are automatically actuated by:
  sensors, suitably mounted on the vehicle producing signals, properly filtered and mixed, derived from height, motion, rate, acceleration, and pressure.

7. The automatic pitch stabilization system of claim 5 wherein said ducting system, regulating differential over-pressure of the aft cushion compartment relative to the forward cushion compartment, further comprises:
  a splitter plate creating two parallel paths, one containing said pressure differential control valve; and
  a fixed orifice in the other parallel path, to maintain a mean pressure differential.

8. The automatic pitch stabilization system of claim 6 wherein said ducting system, regulating differential over-pressure of the aft cushion compartment relative to the forward cushion compartment, further comprises:
  a splitter plate creating two parallel paths, one containing said pressure differential control valve; and
  a fixed orifice in the other parallel path, to maintain a mean pressure differential.

* * * * *